Aug. 12, 1924.  
R. H. STERNE  
ICE CREAM CABINET  
Filed July 5, 1923  
1,504,844
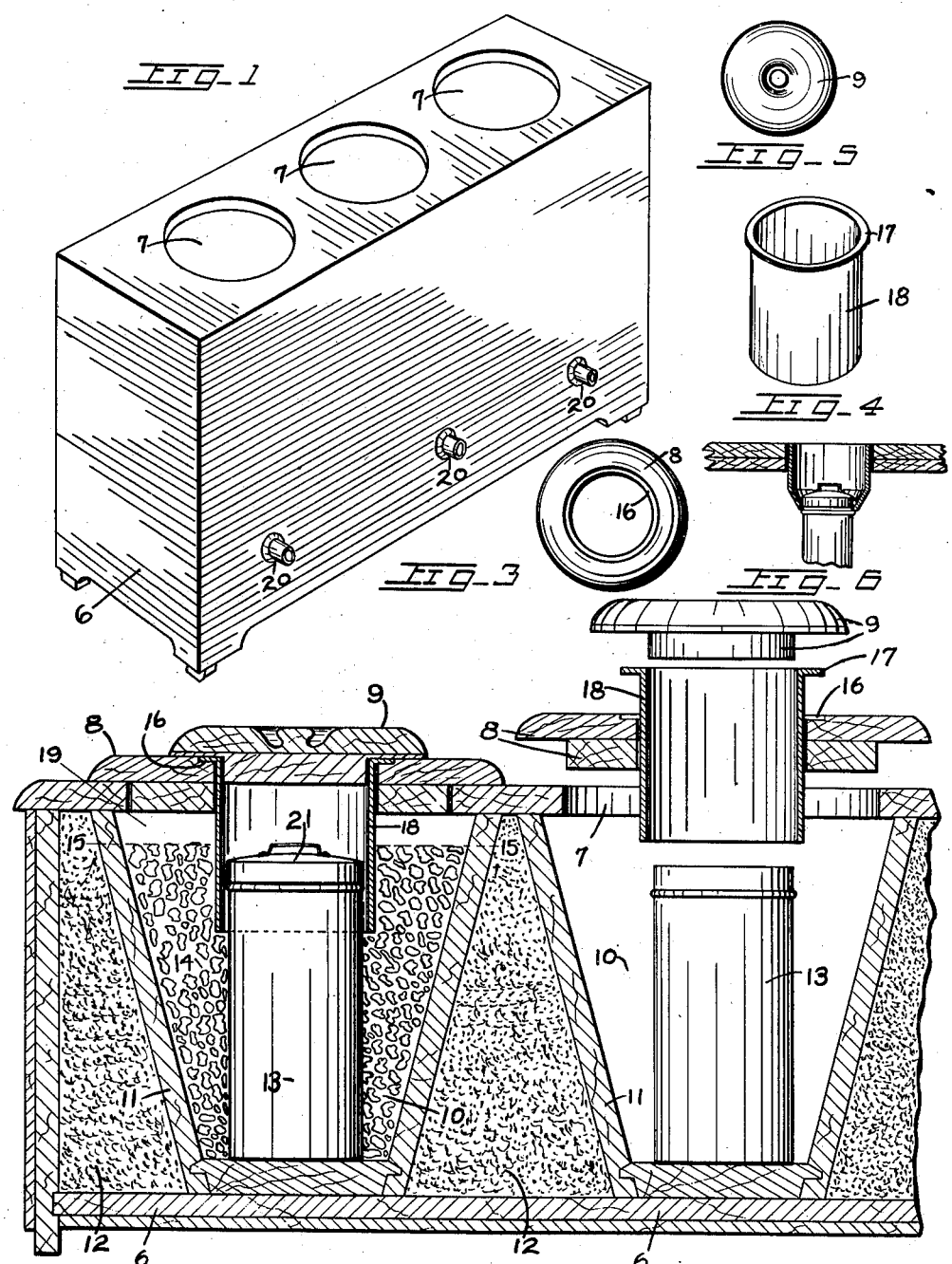
INVENTOR  
*Richie H. Sterne.*  
BY  
*G. Wright Arnold*  
ATTORNEY Patented Aug. 12, 1924.

1,504,844

UNITED STATES PATENT OFFICE.

RICHIE H. STERNE, OF SEATTLE, WASHINGTON, ASSIGNOR TO PATTON WOODEN WARE CO. INC., OF SEATTLE, WASHINGTON, A CORPORATION OF WASHINGTON.

ICE-CREAM CABINET.

Application filed July 5, 1923. Serial No. 649,735.

*To all whom it may concern:*

Be it known that I, RICHIE H. STERNE, a citizen of the United States, residing at Seattle, in the county of King and State of Washington, have invented a certain new and useful Ice-Cream Cabinet.

My invention relates to an ice cream cabinet. More particularly, my invention relates to providing such a cabinet with means which serves to center the ice cream container, increases the refrigerating effect of the refrigerating compartment and renders said cabinet sanitary.

Ice cream cabinets, as heretofore designed, have a refrigerating compartment insulated by means of cork, and the top of this refrigerating compartment is ordinarily removable in segments, one segment consisting of an annular ring and another segment consisting of a cover, which is of sufficient diameter to enable ready access to the ice cream container disposed beneath said cover and surrounded by the refrigerating medium consisting of salt and ice. The top of the ice cream container is disposed in spaced relation to the top of the cabinet. In order to provide a supply of ice to offset the falling of the ice level due to the melting of the ice, the said ice is initially packed to a higher level than the top of the ice cream container, so that, normally, during the first part of removing ice cream from the ice cream container particles of ice and salt are subject to faling within the same, and special care must be taken to avoid such troubles. The level of the ice, it will be understood, is also in spaced relation to the top of the refrigerating compartment. A primary purpose of my invention is to provide means which will eliminate this danger of foreign matter falling within the ice cream container.

Moreover, the sizes of ice cream containers vary in length, so that a further condition which must be met in providing means to exclude said foreign matter is that it must be adapted to permit the top of the ice cream container to be positioned at different levels, i. e., varying spaced relation with respect to the top of the cabinet. Since the disposition of the parts provides for an air space above the ice level in the refrigerating compartment, it is obvious that upon each removal of the cover occasioned by the necessity of gaining access to the ice cream container there is a new supply of air to this upper part of the refrigerating compartment, which results in reducing the refrigerating effect of the ice, or, in short, constitutes a wasteful arrangement. The heat of the incoming air is no sooner absorbed by the ice than the cabinet cover is again removed and the operation repeated. A primary purpose of my invention is to prevent this escape of the chilled air in that portion of the refrigerating chamber above the ice line, and to thereby increase the refrigerating effect of a given quantity of ice, so that a great saving is effected in having the ice cream in salable condition and in the consumption of ice and salt, as well as in the labor of packing. It will be understood that the keeping of the ice cream is entirely dependent upon the efficiency of the refrigerating means. Therefore, the providing of means to increase said refrigerating effect directly effects an economy which is of a continuing nature, both as respects maintaining the ice cream in a salable condition and a saving in ice and salt and labor, the economy being, therefore, of large proportions in the course of time. This advantage of keeping the ice cream in the ice cream container for a much longer period may be very important in those stores located at a relatively great distance from the manufacturer of the ice cream, who ordinarily furnishes the ice and salt for the refrigerating compartment, but it is of the utmost importance in maintaining the reputation and good name for excellent goods of the merchant and the ice cream manufacturer.

Space available for the ice in the refrigerating compartment is limited, and the means employed in effecting the advantages which are herein detailed must in no wise appreciably reduce the said space available for said ice. A primary object of my invention is to provide means which will give the advantages herein set forth to a cabinet, and will satisfy this condition of not appreciably reducing the space ordinarily provided for the ice in said refrigerating compartment.

Further objection to ice cream cabinets as heretofore designed obtains in that there is difficulty in the fact that the packers do not employ the necessary care and attention in centering the ice cream container in the refrigerating compartment. It often happens that the ice cream container is found to be off-center, that is, not directly beneath the cover. In packing the ice cream container, great pains must be taken that an equal amount of ice and salt will be disposed on all sides of said container, as the ice may melt unevenly and a relatively large chunk of ice may wedge its way within the mass of ice, so that a greater pressure is imposed upon one side of the ice cream container than another. A primary object of my invention is to provide means which will function to maintain the ice cream container in an upright position after the ice has partly melted, and insures that the packer properly centers the container beneath the cabinet cover disposed thereabove.

The above mentioned general objects of my invention, together with others inherent in the same, are attained by the device illustrated in the following drawings, the same being merely a preferred exemplary form of embodiment of my invention, throughout which drawings like reference numerals indicate like parts:

Figure 1 is a view in perspective of the body part of an ice cream cabinet;

Fig. 2 is a view in vertical section of a portion of such a cabinet embodying my invention, illustrating, on the left hand side, the annular cover ring, sleeve and cover in closed position, and, on the right hand side, said parts in raised position;

Fig. 3 is a top view of the annular ring part;

Fig. 4 is a view in perspective of the sleeve part;

Fig. 5 is a top view of the cover part; and

Fig. 6 is a modified form of a sleeve without a flange and mounted on top of the ice cream container.

The body part 6 of the cabinet is provided with openings 7, in which are disposed annular cover rings 8, and for the openings in these rings are covers 9.

A refrigerating compartment 10 is formed by a wall 11 of cone form. About this wall heat insulating means in the form of granulated cork 12 is disposed. An ice cream container 13 is axially disposed within the said refrigerating compartment. About this container a refrigerating medium 14, consisting of ice and salt, is packed to the level 15. Annular cover ring 8 is disposed to partially close the opening 7 of the refrigerating compartment 10. About the upper portion of the inner periphery of this ring 10, I provide a groove 16 adapted to receive therein a shoulder or flange 17 of a sleeve 18 of any suitable material, preferably non-corroding and enameled on the inside. A cover 21 is provided to complete the enclosing of the refrigerating compartment.

The mode of operation of an ice cream cabinet embodying my invention is as follows: The refrigerating means 14 is packed about the container 13 and the annular cover ring 8 is disposed within the opening 7. Thereupon the sleeve 18 is pressed downwardly until its shoulder or flange 17 rests upon the groove 16. Thereupon the cover 9 is disposed in operative position upon the ring 8 and the said sleeve 18. Obviously, the packer must properly center the container when packing the ice 14 about the ice cream container 13, for otherwise he will not be able to place the sleeve 18 in its operative position. Hence, the sleeve 18 automatically insures against carelessness on the part of the packer as respects centering the ice cream container 13.

In removing ice cream from the ice cream container, obviously the removal of the cover 9 in no wise exposes the chilled air in the portion 19 of the refrigerating compartment disposed above the ice line to the incoming warmer air. Moreover, the removal of the cover 21 of the ice cream container 13 does not expose the ice cream to the risk of having particles of foreign matter falling within said ice cream container, as the sleeve forms an effective barrier to the ice standing at a higher level than the top of the ice cream container.

Furthermore, after the ice has partially melted, unless the operator is very careful in dishing up the ice cream, he will press down upon the container, and, forgetting for the moment that the ice has melted, cause the container to sink lower in the brine, or to incline to one side, and thereby permit ice and salt to enter the ice cream container by falling in over the top. The sleeve 18 provided in the cabinet embodying my invention removes the danger of such an accident.

Another advantage of my invention resides in the neat appearance which the cabinet presents when the cover is removed. It will be understood that often customers sit on stools at the fountain and are able to look directly over the fountain counter into the ice cream containers and into the cabinet containing the said containers. It very often happens that the ice on top has become soiled and mussy looking, and therefore presents a decidedly unsanitary appearance. If the ice constituting the refrigerating means is thus soiled, the customer naturally wonders if the ice cream itself is not likewise contaminated. By providing a sleeve and having the same enamelled in a cabinet embodying my invention, obviously the ice constituting the refrigerating means is entirely removed from view, and the white enamel coating of the sleeve forms a partition not only to exclude foreign matter from the container, but also as a partition to the untidy appearance of the refrigerating means. The cabinet thus presents a much more sanitary appearance as well as insuring a sanitary ice cream in fact.

The sleeve 18 is preferably of a slightly larger diameter than the size of ice cream container that may be inserted therein, and the form of this sleeve is preferably cylindrical, so that it is capable of receiving ice cream containers of different diameters and of different lengths. The said sleeve is preferably of such length that it will always extend beneath the ice line which descends from the line 15, 15 as the ice melts.

Drain pipes 20 are preferably provided to withdraw the brine. Obviously, an ice cream container of shorter length than that indicated may be employed. Nevertheless, the sleeve will accommodate the cabinet to the use of such shorter can.

Actual experience has demonstrated that a cabinet embodying my invention greatly increases the refrigerating effect of a given quantity of ice and salt. So true has this been that it has been found necessary to reduce the quantity of salt employed to avoid rendering the ice cream too hard. Experience teaches that a saving of thirty per cent of ice and salt results, and be it noted, it is not only in the matter of ice and salt that a saving is effected, but also there is a saving in the labor and time required in supplying the ice cream. An ice cream manufacturer having some twenty-five trucks at present would obviously be able to take care of the same number of customers as at present with at least five trucks less, as the time involved at the different retailing fountains would be very much shortened. The saving of the cost of five trucks would obviously be a material saving. A further saving, which is still more important, results from the fact that the ice cream is well preserved, and does not become soft and liquid. Actual experience has proven that on very warm days ice cream in the containers in cabinets not embodying my invention was not salable, and the only salable ice cream was that in the cabinets embodying my invention. This means that the reputation of the retailer for having good merchantable goods is maintained, and also the reputation of the ice cream manufacturer is protected. This constitutes an even greater factor as respects saving than that heretofore mentioned as respects the saving in the refrigerating means and the labor of packing incident thereto.

Again, actual experience of entirely disinterested retailers of ice cream, employing ice cream cabinets embodying my invention, has proven the following great advantage. So greatly is the refrigerating effect increased that the cover 9 is left off the cabinet and also cover 21 is left off the container 13, so that it is not necessary to remove the same for waiting upon the trade. As the operator must work very fast in serving a large number of customers, a great deal of time is saved on his part in not having to remove the cover each time from the cabinet, it being understood that the device embodying my invention thus may eliminate the necessity not only of removing the cover from the ice cream container but also the cabinet cover.

Obviously, changes may be made in the form, dimensions and arrangement of the parts of my invention, without departing from the principle thereof, the above setting forth only a preferred form of embodiment. Manifestly, the principle of my invention is the providing of a sleeve maintained in operative position to close off chamber 19 without cutting down the refrigerating chamber. It is a matter of indifference whether said sleeve is suspended from the cover 9 or mounted on top of the container 13.

I claim:

1. An ice cream cabinet embodying an ice cream container; a heat insulated refrigerating compartment relatively larger than said ice cream container; an annular cover rim; a cover to fit said rim; and a sleeve suspended from said cover rim and enclosing and extending below the upper portion of said ice cream container and level of the salted ice, whereby upon removal of said cover only that portion of the refrigerating compartment disposed immediately above the ice cream container is exposed to the temperature of the atmosphere of the surrounding room, whereby salted ice may be packed about said ice cream container.

2. In combination with an ice cream cabinet, an annular cover rim having a groove disposed about its upper periphery, a cover for said rim, and a sleeve having a flange about its top, which fits said groove of said annular rim, whereby said sleeve may be suspended from said rim.

In witness whereof, I hereto subscribe my name this 16th day of June, A. D. 1923.

RICHIE H. STERNE.